(No Model.)
F. ECKSTEIN, Jr.
DRIVE CHAIN.
No. 459,038. Patented Sept. 8, 1891.
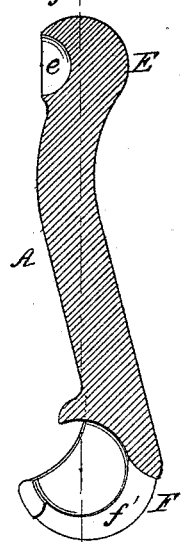
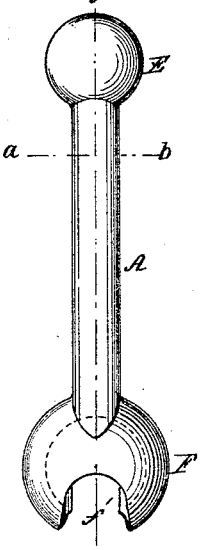
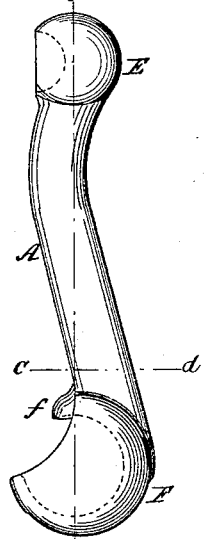
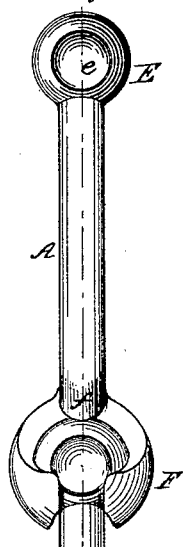
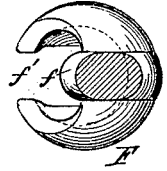

UNITED STATES PATENT OFFICE.

FRED ECKSTEIN, JR., OF CINCINNATI, OHIO.

DRIVE-CHAIN.

SPECIFICATION forming part of Letters Patent No. 459,038, dated September 8, 1891.

Application filed August 23, 1886. Serial No. 211,705. (No model.)

*To all whom it may concern:*

Be it known that I, FRED ECKSTEIN, Jr., a citizen of the United States, residing at Cincinnati, in the county of Hamilton and State of Ohio, have invented certain new and useful Improvements in Drive-Chains, of which the following is a specification.

My invention relates to that class of drive-chains composed of detachable links, and more particularly to chains in which the links are so constructed and connected as to allow free torsional or swiveling play within all desirable range; and it consists in providing one end of the link with a ball and the other end with a concave or spheroidal socket having a throat or opening on the inner side adjacent to the body of the link to admit the ball of an adjacent link of like construction and slotted outwardly from the throat toward and past the longitudinal axis of the link or socket for the passage and swiveling play of the bar of said adjacent link.

It further consists in certain combinations hereinafter described and claimed.

In the drawings, Figure 1 is a longitudinal sectional view of one of the links; Fig. 2, a bottom plan view of the same; Fig. 3, a side view of the same; Fig. 4, a sectional view on the line $a\,b$ of Fig. 2; Fig. 5, a view in section on the line $c\,d$ of Fig. 3, showing the socket end of the link in elevation; Fig. 6, a top plan view showing two of the links coupled to each other; and Fig. 7, a side view of one of the links, showing also a longitudinal section of an adjacent link.

A represents a link preferably of the type known as "single-bar links"—that is, one which enters between forked sprockets upon the wheel, instead of receiving a single tooth or sprocket within a central opening. One end of each link is provided with a knob or enlargement E, of spheroidal or ball form and having in one face a notch, recess, or indentation $e$, of cupped or concave outline; but while I prefer to make this indentation of concave shape, as shown in the drawings, it will be understood that it may be of any desired shape, or the ball may be simply reduced or cut away at a suitable point on its surface. The opposite end of the link is provided with an enlargement F, hollowed out to form a concave or spheroidal socket adapted to receive and serve as a bearing for the ball at the reverse end of an adjacent link of like construction. A portion of the inner side of this second enlargement is cut away adjacent to the body of the link, and reaching therefrom to or about to the transverse diameter of the socket to form an opening or throat sufficiently large to admit said ball into the socket. This opening, when the ball is cupped or recessed, as described, is partially closed by a lug or projection $f$, adapted to take temporarily into the cup in the ball of an adjacent link in the act of engaging such links. When the cup is omitted, the shape of the throat of the socket should be such as to permit the reception or release of the ball when one of its faces is presented and to prevent its release when swung or rotated into a different relative position. The socket is slotted, as at $f$, from the throat and in a direction trending lengthwise of the body of the link around to and a little past the longitudinal diameter of the socket, the slot being sufficiently wide to receive the bar or neck of an adjacent link, but too narrow to permit the passage of the ball. The entire slot may be sufficiently wide to permit lateral play of the link, if desired, while retaining the ball; but the best construction I consider to be that wherein the slot adjacent to the throat just permits the passage of the bar or neck of the link, but is widened at the outer end around the longitudinal axis of the socket. The links are coupled by placing them in such relative position that the cup or recess in the ball of one link will take over the lug in the throatway of the socket of a second link, then swinging or rotating the first link into into its normal position. In the form shown the links must be placed nearly or quite face to face before they can be coupled or uncoupled, and, while readily detached by design, there is no danger of accidental displacement when in use.

I have illustrated and described my invention as applied to a link consisting of a single bar, in which form it is adapted to be used in connection with wheels having forked sprockets which partially embrace the bars and bear against the enlargements at the socket end of the link. It is obvious, however, that so much of my invention as relates to the method of coupling the links is applicable to open links adapted to take over sprocket projections of the ordinary construction.

I claim—

1. As an improvement in drive-chains, a detachable link formed at one end with a ball and at the opposite end with a concave or spheroidal socket, having a throat or opening adjacent to the body of the link to admit the ball of an adjacent link of like construction and slotted from said throat outwardly toward and past the extremity of its longitudinal axis for the passage of the neck of the link.

2. As an improvement in drive-chains, a detachable link formed at one end with a ball and at the opposite end with a concave or spheroidal socket, having a throat or opening adjacent to the body of the link to admit the ball of an adjacent link of like construction and slotted outwardly from said throat toward and past the longitudinal axis of the link and socket to receive the bar or neck of said adjacent link, the width of the slot around the extremity of said axis being greater than the diameter of the bar, but less than the diameter of the ball.

3. As an improvement in drive-chains, a detachable link formed at one end with a recessed ball and at the opposite end with a concave or spheroidal socket, having a throat or opening adjacent to the body of the link to admit the ball of an adjacent link of like construction, and a lug partly closing the throat to temporarily engage with the recess in said ball in the act of coupling and slotted from said throat in the direction of the length of the link for the passage of the bar or neck thereof.

FRED ECKSTEIN, JR.

Witnesses:
JAMES N. RAMSEY,
A. F. HERBSLEB.